US009045635B2

(12) United States Patent
Ochiai et al.

(10) Patent No.: US 9,045,635 B2
(45) Date of Patent: Jun. 2, 2015

(54) POLYLACTIC ACID STEREOCOMPLEX, METHOD FOR PRODUCTION THEREOF, AND NUCLEATING AGENT FOR POLYLACTIC ACID RESIN

(75) Inventors: Shinichiro Ochiai, Nagoya (JP); Tatsuya Takamoto, Nagoya (JP); Sadayuki Kobayashi, Nagoya (JP)

(73) Assignee: Toray Industries, Inc. (JP)

( * ) Notice: Subject to any disclaimer, the term of this patent is extended or adjusted under 35 U.S.C. 154(b) by 568 days.

(21) Appl. No.: 13/390,747

(22) PCT Filed: Aug. 19, 2010

(86) PCT No.: PCT/JP2010/063964
§ 371 (c)(1),
(2), (4) Date: Feb. 23, 2012

(87) PCT Pub. No.: WO2011/024693
PCT Pub. Date: Mar. 3, 2011

(65) Prior Publication Data
US 2012/0202944 A1    Aug. 9, 2012

(30) Foreign Application Priority Data

Aug. 28, 2009  (JP) ................................ 2009-197883

(51) Int. Cl.
*C08L 67/04*    (2006.01)
*C08J 3/00*    (2006.01)
(Continued)

(52) U.S. Cl.
CPC ............ *C08L 67/04* (2013.01); *Y10T 428/2982* (2015.01); *C08K 3/0008* (2013.01);
(Continued)

(58) Field of Classification Search
CPC ............................... C08L 67/04; C08K 5/0083
USPC .......................................................... 524/539
See application file for complete search history.

(56) References Cited

U.S. PATENT DOCUMENTS

| 5,551,777 A | 9/1996 | Tjahjadi et al. |
| 2008/0097074 A1* | 4/2008 | Ouchi et al. ................... 528/354 |

(Continued)

FOREIGN PATENT DOCUMENTS

| CN | 101516973 | 8/2009 |
| JP | 2000-017163 A | 1/2000 |

(Continued)

OTHER PUBLICATIONS

J.M. Ottino et al., "Chaotic Mixing Processes: New Problems and Computational Issues," *Chaos, Solitons & Fractals*, vol. 6, 1995, pp. 425-438.

(Continued)

*Primary Examiner* — Michael Pepitone
(74) *Attorney, Agent, or Firm* — DLA Piper LLP (US)

(57) ABSTRACT

A polylactic acid stereocomplex has a crystal melting peak temperature of 215° C. or more, wherein the crystal melting peak is a single peak and has a peak half width of 12° C. or less, and a crystal melting enthalpy of 60 J/g or more as measured by differential scanning calorimetry. The polylactic acid stereocomplex has a high melting point, good heat resistance, and a high level of mechanical properties and chemical resistance. The method for producing a polylactic acid stereocomplex includes chaotic mixing of 30 to 70 parts by weight of (A) poly-L-lactic acid and 30 to 70 parts by weight of (B) poly-D-lactic acid based on 100 parts by weight of the total of (A) poly-L-lactic acid and (B) poly-D-lactic acid.

12 Claims, 2 Drawing Sheets

(51) Int. Cl.
    B29C 47/60 (2006.01)
    B29C 47/92 (2006.01)
    C08K 3/00 (2006.01)
    C08K 5/00 (2006.01)
    B29C 47/00 (2006.01)

(52) U.S. Cl.
    CPC ............ C08K5/0016 (2013.01); C08K 5/0083
    (2013.01); C08L 2205/02 (2013.01); **C08J
    3/005** (2013.01); C08J 2367/04 (2013.01);
    B29C 47/0004 (2013.01); B29C 47/6056
    (2013.01); B29C 47/6087 (2013.01); **B29C
    47/92** (2013.01); B29C 2947/92695 (2013.01);
    B29C 2947/92704 (2013.01); B29C 2947/92714
    (2013.01)

(56) References Cited

U.S. PATENT DOCUMENTS

| | | |
|---|---|---|
| 2008/0207840 A1 | 8/2008 | Sodergard et al. |
| 2009/0318631 A1 | 12/2009 | Narita et al. |
| 2010/0004404 A1* | 1/2010 | Suzuki et al. .................. 525/415 |

FOREIGN PATENT DOCUMENTS

| | | |
|---|---|---|
| JP | 2003-192884 A | 7/2003 |
| JP | 2005-290257 A | 10/2005 |
| JP | 2007-204727 A | 8/2007 |
| JP | 2008-063356 A | 3/2008 |
| JP | 2008-248022 A | 10/2008 |
| JP | 2008-248162 | 10/2008 |
| JP | 2009-001637 A | 1/2009 |
| JP | 2009-191411 A | 8/2009 |
| JP | 2009-249518 A | 10/2009 |
| WO | WO 2008018474 A1 * | 2/2008 |
| WO | 2010/038860 A1 | 4/2010 |

OTHER PUBLICATIONS

P. Wapperom et al., "The backward-tracking Lagrangian particle method for transient viscoelastic flows," Journal of Non-Newtonian Fluid Mechanics, vol. 91, Issues 2-3, Jul. 1, 2000, pp. 273-295.
Supplementary European Search Report from corresponding EP 10 81 1743 dated Dec. 9, 2014.
Yukiko Furuhashi et al., "High-order structures and mechanical properties of stereocomplex-type poly(lactic acid) melt spun fibers," Polymer, vol. 47 (2006), pp. 5965-5972.
Database Compendex (Online) Engineering Information, Inc., New York, NY US; 2007, Karmakar R. et al., "Extruded PLA-LLDPE films with Bi-functional blend morphology formed with a continuous chaotic blender for barrier and toughness improvements," XP002732791, Database accession No. E20073910836699—*abstract*.
Database WPI, Week 200876, Thomson Scientific, London, GB; AN 2008-M91100, XP002732792.
Matsuko Kakuta et al., "Stereoblock Polylactides as High-Performance Bid-Based Polymers," *Journal of Macromolecular Science®*, Part C: Polymer Reviews, vol. 49 (2009), pp. 107-140.

* cited by examiner

POLYLACTIC ACID STEREOCOMPLEX, METHOD FOR PRODUCTION THEREOF, AND NUCLEATING AGENT FOR POLYLACTIC ACID RESIN

RELATED APPLICATIONS

This is a §371 of International Application No. PCT/JP2010/063964, with an international filing date of Aug. 19, 2010 (WO 2011/024693 A1, published Mar. 3, 2011), which is based on Japanese Patent Application No. 2009-197883, filed Aug. 28, 2009, the subject matter of which is incorporated by reference.

TECHNICAL FIELD

This disclosure relates to a polylactic acid stereocomplex, a method for production thereof, and a nucleating agent for polylactic acid resin. More specifically, the disclosure relates to a polylactic acid stereocomplex having good heat resistance and a high level of mechanical properties and chemical resistance, a method for efficient production thereof, a nucleating agent containing such a polylactic acid stereocomplex, and a method for producing a polylactic acid resin composition using such a nucleating agent.

BACKGROUND

Recently, in view of global environmental protection, attention has been focused on biodegradable polymers that are decomposed under natural environment by the action of microorganisms in soil or water, and various biodegradable polymers have been developed. Among such polymers, for example, polyhydroxybutyrate, polycaprolactone, aliphatic polyester composed of an aliphatic dicarboxylic acid component such as succinic acid or adipic acid and a glycol component such as ethylene glycol or butanediol, and polylactic acid are known as biodegradable polymers capable of being melted and molded.

In particular, polylactic acid, which is relatively inexpensive and has good heat resistance with a melting point of about 170° C., is a promising biodegradable polymer capable of being melted and molded. In addition, the monomer lactic acid has been recently produced at lower cost by fermentation process using microorganisms and, therefore, polylactic acid has been capable of being produced at lower cost. Thus, polylactic acid has been studied to be used as a general-purpose polymer as well as a biodegradable polymer.

Unfortunately, polylactic acid has heat resistance lower than that of petrochemical polyester such as polyethylene terephthalate resin or polybutylene terephthalate resin, and has a problem in which fabrics made of it cannot be ironed.

Lactic acid has optical isomers, and it is known that a stereocomplex crystal formed of a mixture of poly-L-lactic acid and poly-D-lactic acid, which are polymers of L-lactic acid and D-lactic acid, respectively, has a melting point higher than that of a crystal of poly-L-lactic acid or poly-D-lactic acid alone. Unfortunately, a composition obtained by simply compounding poly-L-lactic acid and poly-D-lactic acid contains not only a stereocomplex crystal but also crystals of poly-L-lactic acid itself and poly-D-lactic acid itself as residual components. A complete, high-melting-point, stereocomplex has not been obtained yet, and the heat resistance obtained has been low.

There are disclosed a method of performing stretching to twice or more in at least one direction for the purpose of increasing the stereocomplex crystal content and the heat resistance (Japanese Patent Application Laid-Open (JP-A) No. 2007-204727), a method of performing a heat treatment in the temperature range from the melting point derived from a homo-crystal of polylactic acid to less than the melting point derived from a stereocomplex crystal (JP-A No. 2008-63356), and a method in which a diblock copolymer of poly-L-lactic acid and poly-D-lactic acid is used (JP-A No. 2008-248022).

Unfortunately, the melting peak derived from a stereocomplex crystal produced by these techniques has a wide half value width, and these techniques have been not able to produce a complete stereocomplex, although they can increase the stereocomplex crystal content. Therefore, these techniques have not been able to improve heat resistance, chemical resistance, and mechanical properties sufficiently.

The conventional techniques described above also have a problem in which they need a post-process such as stretching, heat treatment, or polymerization and therefore increase the production cost.

Therefore, adding a nucleating agent to poly-L-lactic acid and poly-D-lactic acid has been studied. JP-A No. 2003-192884 discloses a method of forming a stereocomplex by adding a phosphate metal salt. In this method, crystals of poly-L-lactic acid itself or poly-D-lactic acid itself are partially left, and a complete, high-melting-point, stereocomplex has not been obtained.

It could therefore be helpful to provide a polylactic acid stereocomplex having good heat resistance and a high level of mechanical properties and chemical resistance, a method for efficient production thereof, a nucleating agent for polylactic acid resin containing such a polylactic acid stereocomplex, a method for producing a polylactic acid resin composition using such a nucleating agent, and a molded product.

SUMMARY

We provide a polylactic acid stereocomplex comprising a crystal melting peak temperature of 215° C. or more, wherein the crystal melting peak is a single peak and has a peak half width of 12° C. or less, and a crystal melting enthalpy of 60 J/g or more as measured by differential scanning calorimetry.

We also provide a method for producing a polylactic acid stereocomplex, comprising performing chaotic mixing of 30 to 70 parts by weight of (A) poly-L-lactic acid and 30 to 70 parts by weight of (B) poly-D-lactic acid based on 100 parts by weight of the total of (A) poly-L-lactic acid and (B) poly-D-lactic acid.

We further provide a nucleating agent for polylactic acid resin comprising a polylactic acid stereocomplex having a crystal melting peak temperature of 215° C. or more, wherein the crystal melting peak is a single peak and has a peak half width of 12° C. or less, and a crystal melting enthalpy of 60 J/g or more as measured by differential scanning calorimetry.

The polylactic acid stereocomplex comprising a crystal melting peak temperature of 215° C. or more, wherein the crystal melting peak is a single peak and has a peak half width of 12° C. or less, and a crystal melting enthalpy of 60 J/g or more as measured by differential scanning calorimetry has a high melting point, good heat resistance, and a high level of mechanical properties and chemical resistance. The polylactic acid stereocomplex can be efficiently produced by chaotic mixing.

The polylactic acid stereocomplex can be widely used to form molded products. The polylactic acid stereocomplex is useful for agricultural materials, gardening materials, fishing materials, civil engineering and building materials, stationery products, medical devices, and other applications.

Using the polylactic acid stereocomplex, a highly-effective nucleating agent for polylactic acid resin can also be provided in the form of a powder with a small average particle size. When the nucleating agent containing the polylactic acid stereocomplex is used, a polylactic acid resin composition in which a stereocomplex is formed can be obtained by general compounding of poly-L-lactic acid and poly-D-lactic acid.

DETAILED DESCRIPTION

Hereinafter, our stereocomplexes, methods and nucleating agents are described in more detail.

We provide a polylactic acid stereocomplex comprising a crystal melting peak temperature of 215° C. or more, wherein the crystal melting peak is a single peak and has a peak half width of 12° C. or less, and a crystal melting enthalpy of 60 J/g or more as measured by differential scanning calorimetry.

The polylactic acid stereocomplex preferably has a single peak with a crystal melting peak temperature of from 217° C. to 235° C., more preferably a single peak with a crystal melting peak temperature of from 220° C. to 233° C.

The polylactic acid stereocomplex preferably has a peak half width of from 6° C. to 11° C., more preferably a peak half width of from 6.5° C. to 10.5° C.

The polylactic acid stereocomplex preferably has a crystal melting enthalpy of from 65 J/g to 95 J/g, more preferably from 70 J/g to 90 J/g.

The phrase "a crystal melting peak temperature of 215° C. or more, wherein the crystal melting peak is a single peak" means that a DSC curve obtained by differential scanning calorimetry has a single crystal melting peak with a crystal melting peak temperature of 215° C. or more. The term "a single peak" means that a DSC curve obtained by differential scanning calorimetry has a crystal melting peak only with the maximum value in which no maximal value is associated with the maximum value. A crystal melting peak having an inflection point or points but having no maximal value associated with the maximum is also assumed to be a single peak. When the crystal melting enthalpy is 2 J/g or less, it is assumed that there is no crystal melting peak. When poly-L-lactic acid or poly-D-lactic acid crystallizes alone, a crystal melting peak occurs between 160° C. and 170° C.

Figure 1:
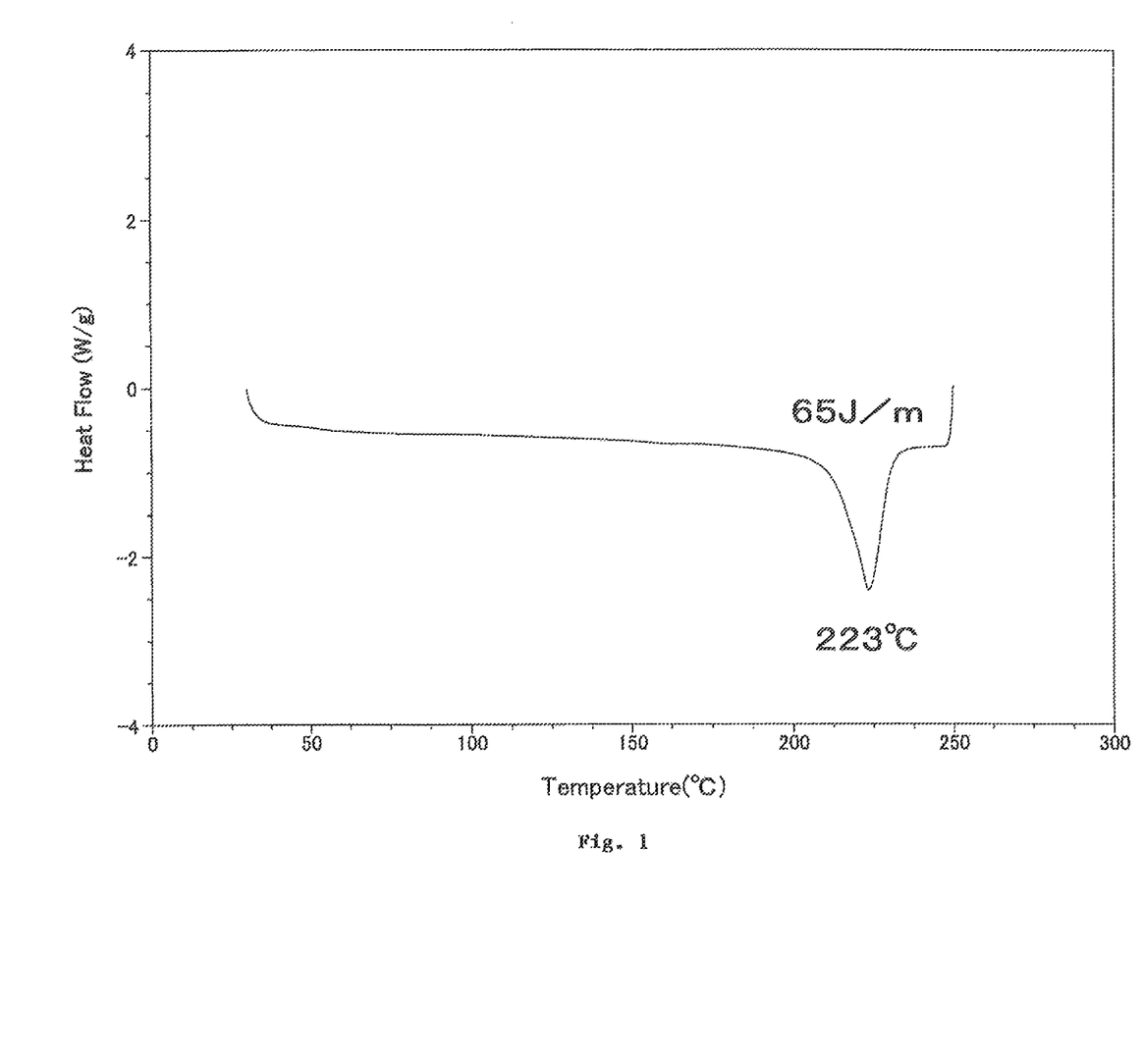
FIG. 1 is a DSC curve obtained by the measurement of the polylactic acid stereocomplex of Example 2 using a differential scanning calorimeter.

FIG. 1 shows a DSC curve obtained by the measurement of the polylactic acid stereocomplex of Example 2 using a differential scanning calorimeter. A single peak was observed at 223° C. No crystal melting peak with a crystal melting enthalpy of more than 2 J/g was found in the other temperature regions.

Figure 2:
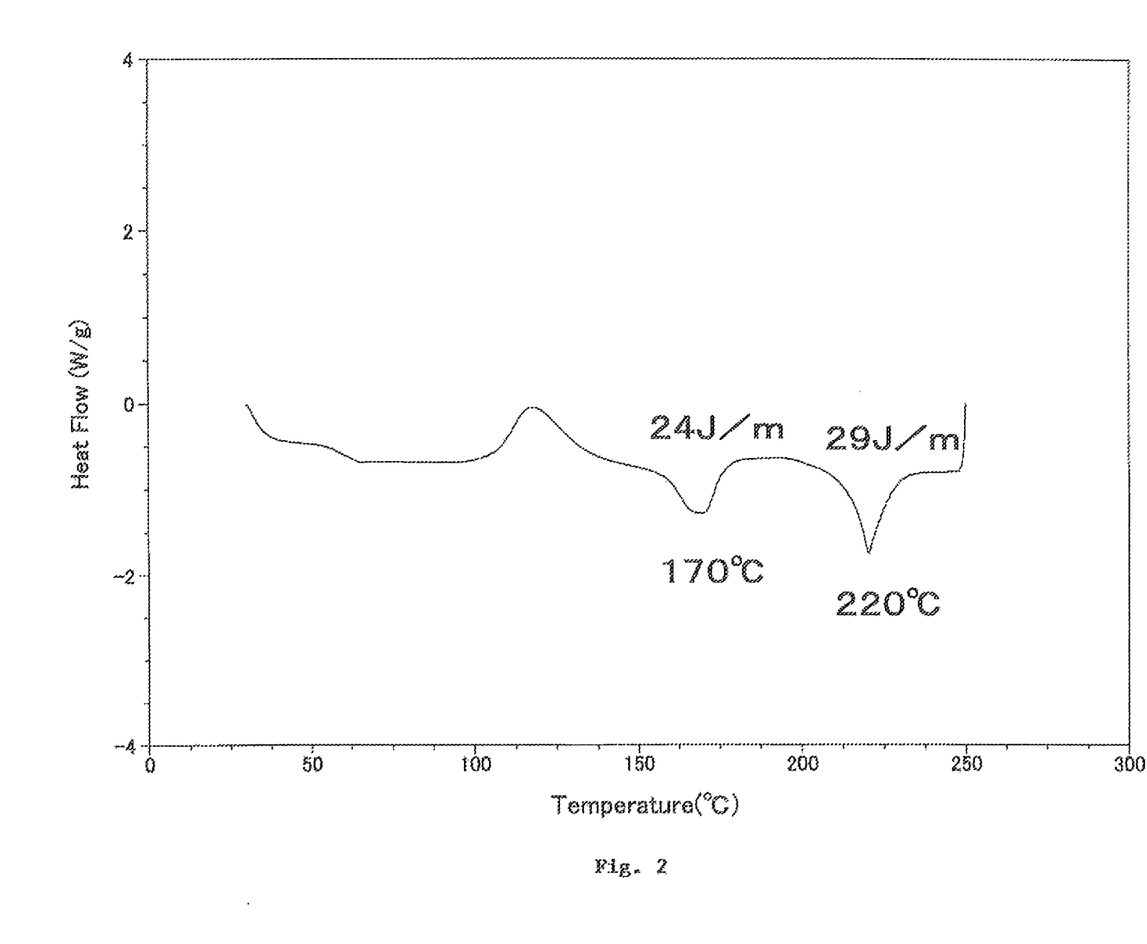
FIG. 2 is a DSC curve obtained by the measurement of the polylactic acid stereocomplex of Comparative Example 2 using a differential scanning calorimeter.

FIG. 2 shows a DSC curve obtained by the measurement of the polylactic acid stereocomplex of Comparative Example 2 using a differential scanning calorimeter. Different peaks were observed at 170° C. and 220° C.

The peak half width corresponds to the width of a peak measured at the midpoint (point c) of a line segment between (point a) and (point b), wherein (point a) is the apex of a crystal melting peak of a DSC curve obtained by differential scanning calorimetry, and (point b) is an intersection point of the base line of the DSC curve and a straight line drawn parallel to the vertical axis of the graph from the apex of the peak (point a). As used herein, the term "the width of a peak" refers to the width on a straight line being parallel to the base line and passing through (point c).

If the crystal melting peak temperature is less than 215° C. or if there are two or more crystal melting peaks, the stereocomplex will have insufficient heat resistance, which may cause a problem in that fabrics made of it cannot be ironed.

If the peak half width is more than 12° C. or if the crystal melting enthalpy is less than 60 J/g, a complete stereocomplex is not formed so that the chemical resistance or the mechanical properties will be low due to low crystallinity.

As measured by differential scanning calorimetry, the polylactic acid stereocomplex preferably has a single cooling crystallization peak with a cooling crystallization peak temperature of 165° C. or more, more preferably a single cooling crystallization peak with a cooling crystallization peak temperature of 167° C. or more.

As measured by differential scanning calorimetry, the polylactic acid stereocomplex preferably has a cooling crystallization enthalpy of 60 J/g or more, more preferably a cooling crystallization enthalpy of 65 J/g or more.

The polylactic acid stereocomplex preferably contains 30 to 70 parts by weight of (A) poly-L-lactic acid and 30 to 70 parts by weight of (B) poly-D-lactic acid, based on 100 parts by weight of the total of (A) poly-L-lactic acid and (B) poly-D-lactic acid. The weight ratio (A)/(B) of (A) poly-L-lactic acid to (B) poly-D-lactic acid is more preferably from 35/65 to 65/35, in particular, preferably from 40/60 to 60/40. When the weight ratio (A)/(B) of (A) poly-L-lactic acid to (B) poly-D-lactic acid is from 30/70 to 70/30, the resulting polylactic acid stereocomplex has a significantly increased melting point, and the stereocomplex can easily form.

(A) poly-L-lactic acid is a polymer composed mainly of L-lactic acid, and (B) poly-D-lactic acid is a polymer composed mainly of D-lactic acid. The content of L-lactic acid units in (A) poly-L-lactic acid is preferably 80% by mole or more, more preferably 90% by mole or more, in particular, preferably 95% by mole or more to obtain a polylactic acid resin composition having a high melting point. The content of D-lactic acid units in (B) poly-D-lactic acid is preferably 80% by mole or more, more preferably 90% by mole or more, in particular, preferably 95% by mole or more to obtain a polylactic acid resin composition having a high melting point.

Each polymer may contain a copolymerized component(s) in addition to each main component, as long as resulting characteristics are not compromised.

Examples of other copolymerizable monomers include polycarboxylic acids, polyhydric alcohols, hydroxycarboxylic acids, and lactones, and specifically include polycarboxylic acids such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-naphthalenedicarboxylic acid, 5-sodium sulfoisophthalic acid, and 5-tetrabutylphophoniumsulfoisophthalic acid; polyhydric alcohols such as ethylene glycol, propylene glycol, butanediol, heptanediol, hexanediol, octanediol, nonanediol, decanediol, 1,4-cyclohexanedimethanol, neopentyl glycol, glycerin, trimethylolpropane, pentaerythritol, bisphenol A, aromatic polyhydric alcohols obtained by addition reaction of bisphenol with ethylene oxide, diethylene glycol, triethylene glycol, polyethylene glycol, polypropylene glycol, and polytetramethylene glycol; hydroxycarboxylic acids such as glycolic acid, 3-hydroxybutyric acid, 4-hydroxybutyric acid, 4-hydroxyvaleric acid, 6-hydroxycaproic acid, and hydroxybenzoic acid; and lactones such as glycolide, ε-caprolactoneglycolide, ε-caprolactone, β-propiolactone, δ-butyrolactone, β- or γ-butyrolactone, pivalolactone, and δ-valerolactone. Besides the above, (A) poly-L-lactic acid may contain a D-lactic acid unit, and (B) poly-D-lactic acid may contain an L-lactic acid unit.

The method of producing (A) poly-L-lactic acid or (B) poly-D-lactic acid is not restricted, and any common method of producing polylactic acid may be used. Specifically, known methods include a two-step lactide method including temporarily producing a cyclic dimer L-lactide or D-lactide using L-lactic acid or D-lactic acid as a raw material and then performing ring-opening polymerization; and a one-step direct polymerization method including directly performing dehydration condensation of the raw material in a solvent, and any of these methods may be used.

The polymerization time can be reduced using a catalyst in the polymerization reaction. Examples of the catalyst include metals such as tin, zinc, lead, titanium, bismuth, zirconium, germanium, antimony, and aluminum, and derivatives thereof.

Such derivatives are preferably metal alkoxides, carboxylates, carbonates, oxides, or halides. Examples include tin chloride, tin octoate, zinc chloride, zinc acetate, lead oxide, lead carbonate, titanium chloride, alkoxytitanium, germanium oxide, and zirconium oxide. Among them, a tin compound is preferred and, in particular, tin octoate is more preferred.

The catalyst is preferably added in an amount of 0.001 to 2 parts by weight, in particular, more preferably 0.001 to 1 part by weight, based on 100 parts by weight of the raw material used (L-lactic acid, D-lactic acid, L-lactide, or D-lactide). If the amount of the catalyst is less than 0.001 parts by weight, the effect of reducing the polymerization time will be low, and if the amount is more than 2 parts by weight, it may tend to be difficult to produce a polymer having a weight average molecular weight enough to form a polylactic acid stereocomplex having good mechanical properties.

The polylactic acid resin composition preferably has a weight average molecular weight of 60,000 or more, more preferably 100,000 or more, so that a polylactic acid stereocomplex having good mechanical properties can be obtained, and even more preferably has a weight average molecular weight of from 120,000 to 1,200,000 in view of moldability and mechanical properties.

The weight average molecular weight is the standard poly(methyl methacrylate) equivalent weight average molecular weight value measured by gel permeation chromatography (GPC) using hexafluoroisopropanol as a solvent.

A method for producing the polylactic acid stereocomplex includes performing chaotic mixing of 30 to 70 parts by weight of (A) poly-L-lactic acid and 30 to 70 parts by weight of (B) poly-D-lactic acid, based on 100 parts by weight of the total of (A) poly-L-lactic acid and (B) poly-D-lactic acid.

Performing chaotic mixing in which (A) poly-L-lactic acid and (B) poly-D-lactic acid are repeatedly stretched and folded during compounding is an important process to form a polylactic acid stereocomplex comprising a crystal melting peak temperature of 215° C. or more, wherein the crystal melting peak is a single peak and has a peak half width of 12° C. or less, and a crystal melting enthalpy of 60 J/g or more as measured by differential scanning calorimetry.

Chaotic mixing can exponentially increase the area of the interface between (A) poly-L-lactic acid and (B) poly-D-lactic acid by repeatedly stretching and folding (A) poly-L-lactic acid and (B) poly-D-lactic acid.

Chaotic mixing will be described. In the context of mixing two fluids, the positions of all points on the interface between the initial two fluids can be set as initial values, and the equation to determine the movement of the fluid particles can be solved so that the time evolution of the interface can be determined. To mix two fluids quickly, the interface should be folded at small intervals, which means that the area of the interface should be increased sharply and, therefore, the distance between two points very close to each other on the initial interface should be increased sharply. Concerning the solutions of the equation to determine the movement of fluids, therefore, mixing can have a chaotic solution in which the distance between two points exponentially increases with time. Such mixing is called chaotic mixing. For example, chaotic mixing is described in Chaos, Solitons & Fractals, Vol. 6, p 425-438.

Chaotic mixing is preferably such that the logarithm of the hypothetical elongation: $\ln L/L_0$, wherein L and $L_0$ represent the length of a line and the initial length of the line, respectively, in a particle tracking method, is 2 or more. The higher logarithm ($\ln L/L_0$) of the hypothetical elongation means that concerning the solutions of the equation to determine the movement of fluids, the distance between two points is more likely to exponentially increase with time. Such a particle tracking method includes randomly determining the initial positions of 1,000 particles at the time t=0 in a cross-section upstream of the screw to be evaluated, and tracking, by simulation, the movement associated with the velocity field calculated by analysis on the screw to be evaluated, in which the logarithm of the hypothetical elongation: $\ln L/L_0$, wherein L and $L_0$ represent the length of a line and the initial length of the line, respectively, can be calculated from the recorded coordinate values of each particle. For example, the particle tracking method is described in Journal of Non-Newtonian Fluid Mechanics, Vol. 91, Issues 2-3, 1 Jul. 2000, p 273-295.

A method for compounding while achieving chaotic mixing can be performed using a known mixing machine commonly used, such as a kneader, a roll mill, a Banbury mixer, or a mono-screw or twin-screw extruder. However, chaotic mixing in which (A) poly-L-lactic acid and (B) poly-D-lactic acid are repeatedly stretched and folded can be created only by lowering the compounding temperature so that the melt viscosity can be increased after the polymers are melted in the process of compounding or by using a screw that is effective in producing a chaotic mixing state as described below. The compounding temperature after the melting of the polymers is preferably set at 60° C. to 195° C., more preferably 60° C. to 190° C., most preferably 60° C. to 185° C. When a twin-screw extruder is used, the compounding temperature after the melting of the polymers is preferably set at 60° C. to 150° C., more preferably 60° C. to 140° C., most preferably 60° C. to 130° C.

If the compounding temperature is set at less than 60° C., the melt viscosity will be high so that the compounding will be difficult, and if the compounding temperature is set higher than 195° C., (A) poly-L-lactic acid and (B) poly-D-lactic acid cannot be stretched enough so that a chaotic mixing state cannot be achieved, which is not preferred.

A screw effective for producing a chaotic mixing state is preferably designed so that the logarithm of the hypothetical elongation: $\ln L/L_0$, wherein L and $L_0$ represent the length of a line and the initial length of the line, respectively, in a particle tracking method, can be 2 or more, more preferably 3 or more, most preferably 4 or more.

It is preferred to use a screw effective for producing a chaotic mixing state. A twin-screw extruder screw effective for producing a chaotic mixing state may include a twist kneading disk having a spiral angle θ of more than 0° to less than) 90° (0°<θ<90°) in the half-rotation direction of the screw, wherein the spiral angle θ is the angle between the apex on the front end side of the kneading disk and the apex on the rear face side. Furthermore, back-mixing screws each including a flight screw having a resin passageway formed in the flight part from the front end to the rear end of the screw, and twist kneading disks may also be alternately arranged to produce chaotic mixing more effectively.

A twin-screw extruder is preferably used to perform compounding by chaotic mixing. When an extruder is used to perform compounding, the total length of zones where compounding are performed while chaotic mixing is achieved (chaotic mixing zones) is preferably from 5 to 80%, more preferably from 10 to 70%, even more preferably from 15 to 60% of the entire length of the screw in the extruder. Zones (chaotic mixing zones) where compounding are performed while chaotic mixing is achieved in a twin-screw extruder are preferably not localized at specific positions in the screw, but placed over the whole area.

A method for producing the polylactic acid stereocomplex preferably includes further adding 0.01 to 10 parts by weight of (C) a nucleating agent to 100 parts by weight of the total of (A) poly-L-lactic acid and (B) poly-D-lactic acid and performing chaotic mixing, so that a more complete polylactic acid stereocomplex can be obtained. The added amount of the nucleating agent (C) is more preferably from 0.01 to 5 parts by weight, even more preferably from 0.05 to 3 parts by weight. The nucleating agent (C) is preferably added in an amount of 0.01 to 10 parts by weight so that a polylactic acid stereocomplex with a high cooling crystallization peak temperature, a high cooling crystallization enthalpy, and good chemical resistance and mechanical properties can be obtained.

Any nucleating agent commonly used for polymers may be used as the nucleating agent (C), and any of an inorganic nucleating agent and an organic nucleating agent may be used. Examples of the inorganic nucleating agent include talc, kaolinite, montmorillonite, synthetic mica, clay, zeolite, silica, graphite, carbon black, zinc oxide, magnesium oxide, titanium oxide, calcium sulfide, boron nitride, calcium carbonate, barium sulfate, aluminum oxide, neodymium oxide, and metal salts of phenylphosphonate. In particular, talc, mica, and silica are preferred, and talc is more preferred. These inorganic nucleating agents are preferably modified with an organic substance so that they can have high dispersibility in the composition.

Examples of the organic nucleating agent include metal salts of organic carboxylic acids, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluylate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonates such as sodium p-toluenesulfonate and sodium sulfoisophthalate; carboxylic acid amides such as stearic acid amide, ethylene bislauric acid amide, palmitic acid amide, hydroxystearic acid amide, erucic acid amide, and trimesic acid tris(tert-butylamide), low density polyethylene, high density polyethylene, polypropylene, polyisopropylene, polybutene, poly-4-methylpentene, poly-3-methylbutene-1, polyvinylcycloalkane, polyvinyltrialkylsilane, sodium or potassium salts of carboxyl group-containing polymers (so-called ionomers) such as sodium salts of ethylene-acrylic or methacrylic acid copolymers and sodium salts of styrene-maleic anhydride copolymers, benzylidene sorbitol and derivatives thereof, phosphate metal salts such as NA-11 and NA-71 (trade names, manufactured by ADEKA CORPORATION), and sodium 2,2-methylbis(4,6-di-tert-butylphenyl). In particular, ethylene bislauric acid amide, benzylidene sorbitol and derivatives thereof, metal salts of organic carboxylic acids, carboxylic acid amides, and phosphate metal salts such as NA-11 and NA-71 manufactured by ADEKA CORPORATION are preferred, and phosphate metal salts such as NA-11 and NA-71 manufactured by ADEKA CORPORATION are more preferred.

One or more nucleating agents may be used alone or in combination. In particular, an inorganic nucleating agent is preferably used in combination with an organic nucleating agent.

A method for producing the polylactic acid stereocomplex preferably includes further adding 0.01 to 10 parts by weight of (D) a plasticizer to 100 parts by weight of the total of (A) poly-L-lactic acid and (B) poly-D-lactic acid and performing chaotic mixing, so that a more complete polylactic acid stereocomplex can be obtained. The added amount of the plasticizer (D) is more preferably from 0.01 to 7 parts by weight, even more preferably from 0.05 to 5 parts by weight. The plasticizer (D) is preferably added in an amount of 0.01 to 10 parts by weight so that a polylactic acid stereocomplex with a high cooling crystallization peak temperature, a high cooling crystallization enthalpy, a high crystal melting peak temperature, and good chemical resistance, mechanical properties and heat resistance can be obtained.

A method for producing the polylactic acid stereocomplex more preferably includes adding 0.01 to 10 parts by weight of (C) a nucleating agent and 0.01 to 10 parts by weight of (D) a plasticizer to 100 parts by weight of the total of (A) poly-L-lactic acid and (B) poly-D-lactic acid and performing chaotic mixing so that a more complete polylactic acid stereocomplex can be obtained.

Any plasticizer commonly used for polymers may be used as the plasticizer (D), examples of which include a polyester plasticizer, a glycerin plasticizer, a polycarboxylic acid ester plasticizer, a polyalkylene glycol plasticizer, and an epoxy plasticizer.

Examples of the polyester plasticizer include a polyester composed of an acid component such as adipic acid, sebacic acid, terephthalic acid, isophthalic acid, naphthalenedicarboxylic acid, diphenyldicarboxylic acid, or rosin and a diol component such as propylene glycol, 1,3-butanediol, 1,4-butanediol, 1,6-hexanediol, ethylene glycol, or diethylene glycol, and polyester composed of hydroxycarboxylic acid such as polycaprolactone. These polyesters may be end-blocked with a monofunctional carboxylic acid, a monofunctional alcohol, or an epoxy compound.

Examples of the glycerin plasticizer include glycerin monoacetomonolaurate, glycerin diacetomonolaurate, glycerin monoacetomonostearate, glycerin diacetomonooleate, and glycerin mono acetomonomontanate.

Examples of the polycarboxylate plasticizer include phthalic acid esters such as dimethyl phthalate, diethyl phthalate, dibutyl phthalate, dioctyl phthalate, diheptyl phthalate, dibenzyl phthalate, and butylbenzyl phthalate; trimellitic acid esters such as tributyl trimellitate, trioctyl trimellitate, and trihexyl trimellitate; adipic acid esters such as diisodecyl adipate, n-octyl-n-decyl adipate, methyl diglycol butyl diglycol adipate, benzylmethyl diglycol adipate, and benzylbutyl diglycol adipate; citric acid esters such as acetyl triethyl citrate and acetyl tributyl citrate; azelaic acid esters such as di-2-ethylhexyl azelate; and sebacic acid esters such as dibutyl sebacate and di-2-ethylhexyl sebacate.

Examples of the polyalkylene glycol plasticizer include polyalkylene glycols such as polyethylene glycol, polypropylene glycol, poly(ethylene oxide-propylene oxide) block and/or random copolymers, polytetramethylene glycol, ethylene oxide addition polymers of bisphenols, propylene oxide addition polymers of bisphenols, and tetrahydrofuran addition polymers of bisphenols, or terminal blocked compounds thereof, such as terminal epoxidized compounds thereof, terminal esterified compounds thereof, and terminal etherified compounds thereof.

While the epoxy plasticizer generally refers to epoxy triglyceride composed of alkyl epoxy stearate and soybean oil, other materials such as so-called "epoxy resins" produced using bisphenol A and epichlorohydrin as main raw materials may also be used.

Examples of other plasticizers include poly-D-acetic acid with a weight average molecular weight of 1,000 to 30,000, poly-L-lactic acid with a weight average molecular weight of 1,000 to 30,000, benzoic acid esters of aliphatic polyols, such as neopentyl glycol dibenzoate, diethylene glycol dibenzoate, triethylene glycol di-2-ethyl butyrate, fatty acid amides such as stearic acid amide, aliphatic carboxylic acid esters such as butyl oleate, oxyacid esters such as methyl acetyl ricinolate and butyl acetyl ricinolate, pentaerythritol, various sorbitols, polyacrylic acid esters, silicone oil, and paraffins.

Among those listed above, a particularly preferred plasticizer is at least one selected from a polyester plasticizer, a polyalkylene glycol plasticizer, poly-D-lactic acid with a weight average molecular weight of 1,000 to 30,000, and poly-L-lactic acid with a weight average molecular weight of 1,000 to 30,000. Poly-D-lactic acid with a weight average molecular weight of 1,000 to 30,000 and poly-L-lactic acid with a weight average molecular weight of 1,000 to 30,000 have been found to be particularly effective when used as a plasticizer. One or more plasticizers may be used alone or in combination.

The polylactic acid stereocomplex can be used as high heat-resistance polylactic acid resin without modification. As long as physical characteristics are not compromised, one or more of common additives such as ultraviolet absorbents, heat stabilizers, lubricants, releasing agents, and coloring agents including dyes and pigments may be added to form a polylactic acid resin composition for use in various applications.

The polylactic acid stereocomplex can be widely used to form molded products. Molded products include films, sheets, fibers, fabrics, nonwoven fabrics, injection-molded products, extrusion-molded products, vacuum pressure-molded products, blow-molded products, and composites with other materials, which are useful for agricultural materials, gardening materials, fishing materials, civil engineering and building materials, stationery products, medical devices, and other applications.

The polylactic acid stereocomplex can be obtained in the form of a powder, which is effective as a nucleating agent for polylactic acid resin.

A nucleating agent for polylactic acid resin containing a polylactic acid stereocomplex having crystal melting peak temperature of 215° C. or more, wherein the crystal melting peak is a single peak and has a peak half width of 12° C. or less, and a crystal melting enthalpy of 60 J/g or more as measured by differential scanning calorimetry forms a complete stereocomplex and therefore is highly effective in promoting the crystallization of polylactic acid resin, when added to polylactic acid resin by a common method. Particularly when the polylactic acid stereocomplex is added to a mixture of (A) poly-L-lactic acid and (B) poly-D-lactic acid, a polylactic acid resin composition in which a stereocomplex is formed can be obtained only by compounding the mixture.

The nucleating agent for polylactic acid resin is preferably added in an amount of 0.01 parts by weight to 30 parts by weight, more preferably 0.1 parts by weight to 20 parts by weight, even more preferably 0.5 parts by weight to 15 parts by weight to 100 parts by weight of the total of (A) poly-L-lactic acid and (B) poly-D-lactic acid. If the added amount is less than 0.01 parts by weight, the effect of the nucleating agent may be low, and if the added amount is more than 30 parts by weight, its dispersibility in the polylactic acid resin may be poor. To obtain a resin composition in which a stereocomplex is formed, (A) poly-L-lactic acid and (B) poly-D-lactic acid are preferably blended in a ratio of 30-70 parts by weight/30-70 parts by weight, more preferably 40-60 parts by weight/40-60 parts by weight, in particular, preferably 45-55 parts by weight/45-55 parts by weight, based on 100 parts by weight of the total of both components.

The polylactic acid resin nucleating agent containing the polylactic acid stereocomplex preferably has an average particle size of 500 µm or less, more preferably 100 µm or less, even more preferably 10 µm or less. The nucleating agent for polylactic acid resin preferably has a smaller average particle size, because the nucleating agent with a smaller particle size has a larger specific surface area, so that it can be more effective. On the other hand, if the average particle size is more than 500 µm, the effect of the nucleating agent may be reduced. The average particle size is the value calculated from the density (g/cm$^3$) and the specific surface area (m$^2$/g) obtained by the flow process-BET one point method using a specific surface area meter according to the following formula: average particle size=6/(density×specific surface area).

Chaotic mixing in which (A) poly-L-lactic acid and (B) poly-D-lactic acid are repeatedly stretched and folded is effective in producing a nucleating agent for polylactic acid resin with particle sizes of at most 500 µm. The process of compounding while achieving chaotic mixing is also preferred, because the process makes it possible to efficiently obtain a powder of a nucleating agent for polylactic acid resin with an average particle size of 500 µm or less.

A polylactic acid resin composition comprising the nucleating agent for polylactic acid resin can also form a stereocomplex easily and produce excellent properties.

When produced by adding (E) the nucleating agent for polylactic acid resin to (A) poly-L-lactic acid and (B) poly-D-lactic acid, the polylactic acid resin composition containing the nucleating agent for polylactic acid resin comprising the polylactic acid stereocomplex can promote the crystallization of a polylactic acid stereocomplex, so that a polylactic acid stereocomplex with a high level of chemical resistance, mechanical properties, heat resistance, and transparency can be obtained, and such a stereocomplex is useful in various applications taking advantage of these properties.

EXAMPLES

Hereinafter, our stereocomplexes, methods and nucleating agents are described more specifically with reference to the examples. In the examples, the term "parts" means parts by weight.

Method for Measuring the Weight Average Molecular Weight of Polylactic Acid

The weight average molecular weight is the standard poly (methyl methacrylate) equivalent weight average molecular weight value measured by gel permeation chromatography (GPC). The GPC measurement was performed using a differential refractometer Waters 410 manufactured by Waters Corp. as a detector, Model 510 manufactured by Waters Corp. as a pump, and Shodex GPC HFIP-806M and Shodex GPC HFIP-LG columns connected in series. The measurement was performed under the conditions of a flow rate of 0.5 mL/minute and hexafluoroisopropanol used as a solvent, in which 0.1 mL of a solution with a sample concentration of 1 mg/mL was injected.

Method for Measuring the Average Particle Size of Polylactic Acid Stereocomplex

The average particle size of the polylactic acid stereocomplex was calculated from the density ($g/cm^3$) and the specific surface area ($m^2/g$) obtained by the flow process-BET one point method using a specific surface area meter (Monosorb, manufactured by Yuasa Ionics Inc.), in which $N_2$ and $N_2/He=30/70$ were used as an adsorption gas and a carrier gas, respectively, according to the following formula: average particle size=6/(density×specific surface area).

Differential Scanning calorimetry

Samples including polylactic acid stereocomplex samples and polylactic acid resin composition samples were measured using a differential scanning calorimeter (DSCQ200 manufactured by TA Instruments). A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The measurement conditions were as follows: heating 10 mg of the sample from 30° C. to 250° C. at a rate of temperature increase of 20° C./minute, keeping the temperature constant at 250° C. for 1 minute, and then decreasing the temperature to 30° C. at a rate of temperature decrease of 20° C./minute.

Chaotic Mixing Zone

The chaotic mixing zone comprises alternately arranged (1) twist kneading disks and (2) back-mixing screws, in which each twist kneading disk (1) has a spiral angle θ of more than 0° to less than 90° (0°<θ<90°) in the half-rotation direction of the screw, wherein the spiral angle θ is the angle between the apex on the front end side of the kneading disk and the apex on the rear face side, and each back-mixing screw (2) comprises a flight screw having a resin passageway formed in the flight part from the front end to the rear end of the screw.

Mixing Machine

In Examples 1 to 7 and Comparative Examples 1 and 2, a Banbury mixer was used, which had left and right Banbury-type screws installed in Laboplast Mill Model 50C150 (manufactured by Toyo Seiki Seisakusho Co., Ltd.).

In Examples 8 to 10 and Comparative Examples 6 to 8, a twin-screw extruder (TEX30XSSST manufactured by The Japan Steel Works, Ltd.) with L/D=45.5 (wherein L is the length from the raw material supply port to the discharge port) was used.

Example 1

In a reaction vessel equipped with a stirrer, 50 parts of L-lactide was uniformly melted at 120° C. under a nitrogen atmosphere and then heated at a temperature of 140° C. After 0.05 parts of tin octoate was added, the mixture was allowed to undergo a polymerization reaction for 1.1 hours. After the polymerization reaction was completed, the reaction product was dissolved in chloroform and then precipitated in methanol (in an amount ten times the amount of chloroform) under stirring so that the monomer was completely removed, and (A) poly-L-lactic acid with a weight average molecular weight of 120,000 was obtained.

In a reaction vessel equipped with a stirrer, 50 parts of D-lactide was uniformly melted at 120° C. under a nitrogen atmosphere and then heated at a temperature of 140° C. After 0.05 parts of tin octoate was added, the mixture was allowed to undergo a polymerization reaction for 1.1 hours. After the polymerization reaction was completed, the reaction product was dissolved in chloroform and then precipitated in methanol (in an amount ten times the amount of chloroform) under stirring so that the monomer was completely removed, and (B) poly-D-lactic acid with a weight average molecular weight of 111,000 was obtained.

After the (A) poly-L-lactic acid and the (B) poly-D-lactic acid were previously dry-blended in a weight ratio (A)/(B) of 50/50, the blend was fed to a Banbury mixer with the number of screw revolutions set at 10 rpm, and kneaded at a barrel set temperature of 185° C. In Example 1, a powdery product was precipitated during the kneading, and the blend was entirely turned into a powder form in a kneading time of about 30 seconds so that a polylactic acid resin powder with an average particle size of 5 μm was obtained. During the kneading in the Banbury mixer, how the sample was blended was observed from the window at the top of the mixer. As a result, in Example 1, a chaotic mixing state was produced in which (A) poly-L-lactic acid and (B) poly-D-lactic acid were repeatedly stretched and folded.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystallization peak temperature, and it was demonstrated that a polylactic acid stereocomplex was obtained.

Example 2

(A) poly-L-lactic acid and (B) poly-D-lactic acid were prepared as in Example 1. After the (A) poly-L-lactic acid, the (B) poly-D-lactic acid, and (C-1) a nucleating agent (talc, MICRO ACE P-6 manufactured by Nippon Talc Co., Ltd.) were previously dry-blended in a weight ratio (A)/(B)/(C-1) of 50/50/1, the blend was fed to a Banbury mixer with the number of screw revolutions set at 10 rpm, and compounding at a barrel set temperature of 185° C. In Example 2, a powdery product was precipitated during compounding, and the blend was entirely turned into a powder form in a compounding time of about 30 seconds so that a polylactic acid resin composition with an average particle size of 5 μm was obtained. During compounding in the Banbury mixer, how the sample was blended was observed from the window at the top of the mixer. As a result, in Example 2, a chaotic mixing state was produced in which (A) poly-L-lactic acid and (B) poly-D-lactic acid were repeatedly stretched and folded.

The resulting sample was subjected to measurement using a differential scanning calorimeter. FIG. 1 shows a DSC curve measured by the differential scanning calorimeter. The crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystalliza-

Example 3

(A) poly-L-lactic acid and (B) poly-D-lactic acid were prepared as in Example 1. After the (A) poly-L-lactic acid, the (B) poly-D-lactic acid, (C-1) a nucleating agent (talc, MICRO ACE P-6 manufactured by Nippon Talc Co., Ltd.), and (C-2) a nucleating agent (a phosphate metal salt, NA-71 manufactured by ADEKA CORPORATION) were previously dry-blended in a weight ratio (A)/(B)/(C-1)/(C-2) of 50/50/1/1, the blend was fed to a Banbury mixer with the number of screw revolutions set at 10 rpm, and compounded at a barrel set temperature of 185° C. In Example 3, a powdery product was precipitated during compounding, and the blend was entirely turned into a powder form in a compounding time of about 30 seconds so that a polylactic acid resin composition with an average particle size of 5 μm was obtained. During compounding in the Banbury mixer, how the sample was blended was observed from the window at the top of the mixer. As a result, in Example 3, a chaotic mixing state was produced in which (A) poly-L-lactic acid and (B) poly-D-lactic acid were repeatedly stretched and folded.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystallization peak temperature, and it was demonstrated that a polylactic acid stereocomplex was obtained.

Example 4

The (A) poly-L-lactic acid obtained in Example 1 was hydrolyzed at 121° C. and 100% RH for 2.6 hours using a pressure cooker tester for wet heat test (HAST CHAMBER EHS-221M manufactured by TABAI ESPEC CORP.) so that poly-L-lactic acid with a weight average molecular weight of 21,000 was obtained, which was used as (D-1) a plasticizer.

The (B) poly-D-lactic acid obtained in Example 1 was hydrolyzed at 121° C. and 100% RH for 2.6 hours using a pressure cooker tester for wet heat test (HAST CHAMBER EHS-221M manufactured by TABAI ESPEC CORP.) so that poly-D-lactic acid with a weight average molecular weight of 20,000 was obtained, which was used as (D-2) a plasticizer.

(A) poly-L-lactic acid and (B) poly-D-lactic acid were prepared as in Example 1. After the (A) poly-L-lactic acid, the (B) poly-D-lactic acid, (C-1) a nucleating agent (talc, MICRO ACE P-6 manufactured by Nippon Talc Co., Ltd.), (D-1) poly-L-lactic acid with a weight average molecular weight of 21,000, and (D-2) poly-D-lactic acid with a weight average molecular weight of 20,000 were previously dry-blended in a weight ratio (A)/(B)/(C-1)/(D-1)/(D-2) of 50/50/1/1/1, the blend was fed to a Banbury mixer with the number of screw revolutions set at 10 rpm, and compounded at a barrel set temperature of 185° C. In Example 4, a powdery product was precipitated during compounding, and the blend was entirely turned into a powder form in a compounding time of about 30 seconds so that a polylactic acid resin composition with an average particle size of 5 μm was obtained. During compounding in the Banbury mixer, how the sample was blended was observed from the window at the top of the mixer. As a result, in Example 4, a chaotic mixing state was produced in which (A) poly-L-lactic acid and (B) poly-D-lactic acid were repeatedly stretched and folded.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystallization peak temperature, and it was demonstrated that a polylactic acid stereocomplex was obtained.

Example 5

(A) poly-L-lactic acid and (B) poly-D-lactic acid were prepared as in Example 1. After the (A) poly-L-lactic acid, the (B) poly-D-lactic acid, (C-1) a nucleating agent (talc, MICRO ACE P-6 manufactured by Nippon Talc Co., Ltd.), and (D-3) a plasticizer (polyester plasticizer, MAXIMOL FSK-2000 manufactured by KAWASAKI KASEI CHEMICALS LTD.) were previously dry-blended in a weight ratio (A)/(B)/(C-1)/(D-3) of 50/50/1/1, the blend was fed to a Banbury mixer with the number of screw revolutions set at 10 rpm, and compounded at a barrel set temperature of 185° C. In Example 5, a powdery product was precipitated during compounding, and the blend was entirely turned into a powder form in a compounding time of about 30 seconds so that a polylactic acid resin composition with an average particle size of 5 μm was obtained. During compounding in the Banbury mixer, how the sample was blended was observed from the window at the top of the mixer. As a result, in Example 5, a chaotic mixing state was produced in which (A) poly-L-lactic acid and (B) poly-D-lactic acid were repeatedly stretched and folded.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystallization peak temperature, and it was demonstrated that a polylactic acid stereocomplex was obtained.

Example 6

(A) poly-L-lactic acid and (B) poly-D-lactic acid were prepared as in Example 1. (D-1) poly-L-lactic acid with a weight average molecular weight of 21,000 and (D-2) poly-D-lactic acid with a weight average molecular weight of 20,000 were also prepared as in Example 4. After the (A) poly-L-lactic acid, the (B) poly-D-lactic acid, (C-1) a nucleating agent (talc, MICRO ACE P-6 manufactured by Nippon Talc Co., Ltd.), (C-2) a nucleating agent (a phosphate metal salt, NA-71 manufactured by ADEKA CORPORATION), the (D-1) poly-L-lactic acid with a weight average molecular weight of 21,000, and the (D-2) poly-D-lactic acid with a weight average molecular weight of 20,000 were previously dry-blended in a weight ratio (A)/(B)/(C-1)/(C-2)/(D-1)/(D-2) of 50/50/1/1/1/1, the blend was fed to a Banbury mixer with the number of screw revolutions set at 10 rpm, and compounded at a barrel set temperature of 185° C. In Example 6, a powdery product was precipitated during compounding, and the blend was entirely turned into a powder form in a compounding time of about 30 seconds so that a polylactic acid resin composition with an average particle size of 5 μm was obtained. During compounding in the Banbury mixer, how the sample was blended was observed from the window at the top of the mixer. As a result, in Example 6, a chaotic mixing state was produced in which (A) poly-L-lactic acid and (B) poly-D-lactic acid were repeatedly stretched and folded.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystallization peak temperature, and it was demonstrated that a polylactic acid stereocomplex was obtained.

Example 7

(A) poly-L-lactic acid and (B) poly-D-lactic acid were prepared as in Example 1. After the (A) poly-L-lactic acid, the (B) poly-D-lactic acid, (C-1) a nucleating agent (talc, MICRO ACE P-6 manufactured by Nippon Talc Co., Ltd.), (C-2) a nucleating agent (a phosphate metal salt, NA-71 manufactured by ADEKA CORPORATION), and (D-3) a plasticizer (polyester plasticizer, MAXIMOL FSK-2000 manufactured by KAWASAKI KASEI CHEMICALS LTD.) were previously dry-blended in a weight ratio (A)/(B)/(C-1)/(C-2)/(D-3) of 50/50/1/1/1, the blend was fed to a Banbury mixer with the number of screw revolutions set at 10 rpm, and compounded at a barrel set temperature of 185° C. In Example 7, a powdery product was precipitated during compounding, and the blend was entirely turned into a powder form in a compounding time of about 30 seconds so that a polylactic acid resin composition with an average particle size of 5 μm was obtained. During compounding in the Banbury mixer, how the sample was blended was observed from the window at the top of the mixer. As a result, in Example 7, a chaotic mixing state was produced in which (A) poly-L-lactic acid and (B) poly-D-lactic acid were repeatedly stretched and folded.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 1. A single peak was obtained with respect to both the crystal melting peak temperature and the cooling crystallization peak temperature, and it was demonstrated that a polylactic acid stereocomplex was obtained.

TABLE 1

|  |  | Example 1 | Example 2 | Example 3 | Example 4 | Example 5 | Example 6 | Example 7 |
|---|---|---|---|---|---|---|---|---|
| Melting peak temperature | ° C. | 224 | 223 | 223 | 226 | 226 | 227 | 227 |
| Melting enthalpy | J/m | 66 | 65 | 68 | 68 | 68 | 70 | 69 |
| Half value width | ° C. | 10.6 | 9.8 | 9.6 | 9.4 | 9.5 | 9.2 | 9.3 |
| Cooling crystallization peak temperature | ° C. | 114 | 168 | 170 | 169 | 168 | 171 | 170 |
| Cooling crystallization enthalpy | J/m | 8 | 68 | 70 | 70 | 68 | 70 | 69 |
| Average particle size | μm | 5 | 5 | 5 | 5 | 5 | 5 | 5 |

Comparative Example 1

(A) poly-L-lactic acid and (B) poly-D-lactic acid were prepared as in Example 1. After the (A) poly-L-lactic acid and the (B) poly-D-lactic acid were previously dry-blended in a weight ratio (A)/(B) of 50/50, the blend was fed to a Banbury mixer with the number of screw revolutions set at 10 rpm, and compounded at a barrel set temperature of 230° C. In Comparative Example 1, no powdery product was precipitated during compounding, and after a compounding time of 2 minutes, a bulky polylactic acid resin composition was taken out and obtained. During compounding in the Banbury mixer, how the sample was blended was observed from the window at the top of the mixer. As a result, in Comparative Example 1, the (A) poly-L-lactic acid and the (B) poly-D-lactic acid were ruptured without being sufficiently stretched, and it was determined that no chaotic mixing state was achieved.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 2. Two crystal melting peak temperatures were observed.

Comparative Example 2

(A) poly-L-lactic acid and (B) poly-D-lactic acid were prepared as in Example 1. After the (A) poly-L-lactic acid, the (B) poly-D-lactic acid, and (C-1) a nucleating agent (talc, MICRO ACE P-6 manufactured by Nippon Talc Co., Ltd.) were previously dry-blended in a weight ratio (A)/(B)/(C-1) of 50/50/1, the blend was fed to a Banbury mixer with the number of screw revolutions set at 10 rpm, and compounded at a barrel set temperature of 230° C. In Comparative Example 2, no powdery product was precipitated during compounding, and after a compounding time of 2 minutes, a bulky polylactic acid resin composition was taken out and obtained. During compounding in the Banbury mixer, how the sample was blended was observed from the window at the top of the mixer. As a result, in Comparative Example 2, the (A) poly-L-lactic acid and the (B) poly-D-lactic acid were ruptured without being sufficiently stretched, and it was determined that no chaotic mixing state was achieved.

The resulting sample was subjected to measurement using a differential scanning calorimeter. FIG. 2 shows a DSC curve measured by the differential scanning calorimeter. The crystal melting peak temperature, the peak half width, the crystal melting enthalpy, the cooling crystallization peak temperature, and the cooling crystallization enthalpy were determined from the DSC curve. The results are shown in Table 2. Two crystal melting peak temperatures and two cooling crystallization peak temperatures were observed.

Comparative Example 3

The sample obtained in Comparative Example 1 was placed in a batch dryer under a nitrogen flow and heat-treated at 215° C. for 1.5 hours.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 2. A single peak was obtained with respect to both the crystal melting peak temperature and the cooling crystallization peak temperature, but the half value width for the melting peak temperature was larger than that of the polylactic acid stereocomplex of each example.

Comparative Example 4

In a reaction vessel equipped with a cooling distillation tube, 100 parts of L-lactide and 0.15 parts of stearyl alcohol were melted at 190° C. under a nitrogen atmosphere. When the L-lactide was completely melted, 0.05 parts of tin octoate and 500 μL of toluene were added together from the raw material feed port, and polymerization was performed at 190° C. for 1 hour so that (A) poly-L-lactic acid was obtained. After the ring-opening polymerization to form (A) poly-L-lactic acid was completed, the pressure in the reaction vessel was reduced to 133 kPa, and excess L-lactide was removed. Subsequently, 100 parts of D-lactide was added. The temperature in the reaction vessel was kept at 190° C., and the ring-opening polymerization was continued for 2 hours. After polymerization was completed, the reaction vessel was heated to 230° C., and excess D-lactide was removed while the pressure was reduced to 133 kPa so that a polylactic acid stereocomplex with a weight average molecular weight of 115,000 was obtained.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 2. A single peak was obtained with respect to both the crystal melting peak temperature and the cooling crystallization peak temperature, but the half value width for the melting peak temperature was larger than that of the polylactic acid stereocomplex of each example.

Comparative Example 5

The sample obtained in Comparative Example 1 was heat-pressed under 1.5 MPa at 250° C. for 1 minute to form a sheet (0.2 mm in thickness). The resulting sheet was fed to an automatic biaxial film extruder (Model IMC-11A9 manufactured by Imoto Machinery Co., Ltd.), preheated at 60° C. for 50 seconds with hot air, and then biaxially co-stretched three times to form a film.

The resulting film was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 2. A single peak was obtained with respect to both the crystal melting peak temperature and the cooling crystallization peak temperature, but the half value width for the melting peak temperature was larger than that of the polylactic acid stereocomplex of each example.

TABLE 2

|  |  | Comparative Example 1 | Comparative Example 2 | Comparative Example 3 | Comparative Example 4 | Comparative Example 5 |
|---|---|---|---|---|---|---|
| Melting peak temperature | ° C. | 166, 219 | 170, 220 | 225 | 220 | 211 |
| Melting enthalpy | J/m | 24, 47 | 24, 29 | 62 | 59 | 57 |
| Half value width | ° C. | 14.4 | 16 | 13 | 14.7 | 12.5 |
| Cooling crystallization peak temperature | ° C. | 114 | 117, 166 | 116 | 130 | 140 |
| Cooling crystallization enthalpy | J/m | 16 | 14, 38 | 12 | 50 | 59 |
| Average particle size | μm | — | — | — | — | — |

In Comparative Examples 1 to 5, it was not possible to obtain a polylactic acid stereocomplex having a crystal melting peak temperature of 215° C. or more, wherein the crystal melting peak is a single peak and has a peak half width of 12° C. or less, and a crystal melting enthalpy of 60 J/g or more.

Example 8

(A) poly-L-lactic acid and (B) poly-D-lactic acid were prepared as in Example 1. The (A) poly-L-lactic acid and the (B) poly-D-lactic acid were previously dry-blended in a weight ratio (A)/(B) of 50/50. Subsequently, the blend was fed to a twin-screw extruder in which the number of screw revolutions was set at 50 rpm and the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder, and the blend was compounded at a barrel temperature of 120° C. in the area from the polymer melting part to the bent. In Example 8, a powdery product was discharged from the discharge port, and a polylactic acid resin composition with an average particle size of 3 μm was obtained. Also using CAE analysis software SCREWFLOW-MULTI installed in the extruder manufactured by The Japan Steel Works, Ltd., the initial positions of 1,000 particles were randomly determined at the time t=0 in a cross-section upstream of the screw, and the movement associated with the velocity field calculated by analysis on the screw to be evaluated was tracked by simulation, so that the logarithm of the hypothetical elongation: $\ln L/L_0$, wherein L and $L_0$ represent the length of a line and the initial length of the line, respectively, was calculated. As a result, $\ln L/L_0$ for the type A was 4.2.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 3. A single peak was obtained with respect to both the crystal melting peak temperature and the cooling crystallization peak temperature, and it was demonstrated that a polylactic acid stereocomplex was obtained.

Example 9

(A) poly-L-lactic acid and (B) poly-D-lactic acid were prepared as in Example 1. The (A) poly-L-lactic acid, the (B) poly-D-lactic acid, (C-1) a nucleating agent (talc, MICRO ACE P-6 manufactured by Nippon Talc Co., Ltd.), and (C-2) a nucleating agent (a phosphate metal salt, NA-71 manufactured by ADEKA CORPORATION) were previously dry-blended in a weight ratio (A)/(B)/(C-1)/(C-2) of 50/50/1/1. Subsequently, the blend was fed to a twin-screw extruder in which the number of screw revolutions was set at 50 rpm and the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder, and the blend was compounded at a barrel temperature of 120° C. in the area from the polymer melting part to the bent. In Example 9, a powdery product was discharged from the discharge port, and a polylactic acid resin composition with an average particle size of 3 μm was obtained. Also using CAE analysis software SCREWFLOW-MULTI installed in the extruder manufactured by The Japan Steel Works, Ltd., the initial positions of 1,000 particles were randomly determined at the time t=0 in a cross-section upstream of the screw, and the movement associated with the velocity field calculated by analysis on the screw to be evaluated was tracked by simulation so that the logarithm of the hypothetical elongation: $\ln L/L_0$, wherein L and $L_0$ represent the length of a line and the initial length of the line, respectively, was calculated. As a result, $\ln L/L_0$ for the type A was 4.2.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 3. A single peak was obtained with respect to both the crystal melting peak temperature and the cooling crystallization peak temperature, and it was demonstrated that a polylactic acid stereocomplex was obtained.

Comparative Example 6

(A) poly-L-lactic acid and (B) poly-D-lactic acid were prepared as in Example 1. The (A) poly-L-lactic acid and the (B) poly-D-lactic acid were previously dry-blended in a weight ratio (A)/(B) of 50/50. Subsequently, the blend was fed to a twin-screw extruder in which the number of screw revolutions was set at 150 rpm and the screw arrangement (type B) used was such that general kneading disks (L/D=3.8) were placed from the position of L/D=22, 28, and the blend was compounded at a barrel temperature of 210° C. in the area from the polymer melting part to the bent. In Comparative Example 6, no powdery product was discharged from the discharge port during discharging and compounding, and the gut discharged from the die was allowed to pass for 15 seconds through a cooling bath filled with water having a controlled temperature of 10° C. so that the structure was fixed by rapid cooling. Subsequently, the gut was pelletized by a strand cutter so that whitish pellets were obtained. Also using CAE analysis software SCREWFLOW-MULTI installed in the extruder manufactured by The Japan Steel Works, Ltd., the initial positions of 1,000 particles were randomly determined at the time t=0 in a cross-section upstream of the screw, and movement associated with the velocity field calculated by analysis on the screw to be evaluated was tracked by simulation so that the logarithm of the hypothetical elongation: $\ln L/L_0$, wherein L and $L_0$ represent the length of a line and the initial length of the line, respectively, was calculated. As a result, $\ln L/L_0$ for the type B was 1.5.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Table 3. When general compounding were performed, two crystal melting peak temperatures were observed.

Comparative Example 7

(A) poly-L-lactic acid and (B) poly-D-lactic acid were prepared as in Example 1. The (A) poly-L-lactic acid, the (B) poly-D-lactic acid, and (C-1) a nucleating agent (talc, MICRO ACE P-6 manufactured by Nippon Talc Co., Ltd.) were previously dry-blended in a weight ratio (A)/(B)/(C-1) of 50/50/1. Subsequently, the blend was fed to a twin-screw extruder in which the number of screw revolutions was set at 150 rpm and the screw arrangement (type B) used was such that general kneading disks (L/D=3.8) were placed from the position of L/D=22, 28, and the blend was compounded at a barrel temperature of 210° C. in the area from the polymer melting part to the bent. In Comparative Example 7, no powdery product was discharged from the discharge port during discharging and compounding, and the gut discharged from the die was allowed to pass for 15 seconds through a cooling bath filled with water having a controlled temperature of 10° C. so that the structure was fixed by rapid cooling. Subsequently, the gut was pelletized by a strand cutter so that whitish pellets were obtained. Also using CAE analysis software SCREWFLOW-MULTI installed in the extruder manufactured by The Japan Steel Works, Ltd., the initial positions of 1,000 particles were randomly determined at the time t=0 in a cross-section upstream of the screw, and movement associated with the velocity field calculated by analysis on the screw to be evaluated was tracked by simulation so that the logarithm of the hypothetical elongation: $\ln L/L_0$, wherein L and $L_0$ represent the length of a line and the initial length of the line, respectively, was calculated. As a result, $\ln L/L_0$ for the type B was 1.5.

The resulting sample was subjected to measurement using a differential scanning calorimeter. A DSC curve was obtained by the measurement, and the crystal melting peak temperature, the peak half width, the crystal melting enthalpy, the cooling crystallization peak temperature, and the cooling crystallization enthalpy were determined from the resulting DSC curve. The results are shown in Tables 2 and 3. When general compounding were performed, two crystal melting peak temperatures and two cooling crystallization peak temperatures were observed.

TABLE 3

|  |  | Example 8 | Example 9 | Comparative Example 6 | Comparative Example 7 |
|---|---|---|---|---|---|
| Melting peak temperature | ° C. | 230 | 231 | 165, 218 | 169, 220 |
| Melting enthalpy | J/m | 70 | 78 | 24, 46 | 24, 29 |
| Half value width | ° C. | 9.4 | 9 | 14.3 | 15.8 |
| Cooling crystallization peak temperature | ° C. | 116 | 170 | 114 | 117, 165 |
| Cooling crystallization enthalpy | J/m | 9 | 68 | 14 | 15, 44 |
| Average particle size | μm | 3 | 3 | — | — |

In Comparative Examples 6 and 7, it was not possible to obtain a polylactic acid stereocomplex having a crystal melting peak temperature of 215° C. or more, wherein the crystal melting peak is a single peak and has a peak half width of 12° C. or less, and a crystal melting enthalpy of 60 J/g or more.

Example 10

(A) poly-L-lactic acid and (B) poly-D-lactic acid were prepared as in Example 1. The (E) polylactic acid stereocomplex with an average particle size of 5 μm obtained in Example 1 was prepared. The (A) poly-L-lactic acid, the (B) poly-D-lactic acid, and the (E) polylactic acid stereocomplex with an average particle size of 5 μm obtained in Example 1 were previously dry-blended in a weight ratio (A)/(B)/(E) of 50/50/1. Subsequently, the blend was fed to a twin-screw extruder in which the number of screw revolutions was set at 150 rpm and the screw arrangement (type B) used was such that general kneading disks (L/D=3.8) were placed from the position of L/D=22, 28, and the blend was kneaded at a barrel temperature of 210° C. in the area from the polymer melting part to the bent. The gut discharged from the die was allowed to pass for 15 seconds through a cooling bath filled with water having a controlled temperature of 10° C. so that the structure was fixed by rapid cooling. Subsequently, the gut was pelletized by a strand cutter so that transparent pellets were obtained. Also using CAE analysis software SCREWFLOW-MULTI installed in the extruder manufactured by The Japan Steel Works, Ltd., the initial positions of 1,000 particles were randomly determined at the time t=0 in a cross-section upstream of the screw, and the movement associated with the velocity field calculated by analysis on the screw to be evaluated was tracked by simulation so that the logarithm of the hypothetical elongation: $\ln L/L_0$, wherein L and $L_0$ represent the length of a line and the initial length of the line, respectively, was calculated. As a result, $\ln L/L_0$ for the type B was 1.5.

The resulting sample was subjected to measurement using a differential scanning calorimeter. A DSC curve was obtained by the measurement, and the cooling crystallization peak temperature and the cooling crystallization enthalpy were determined from the resulting DSC curve. The cooling crystallization peak temperature was 165° C., and the cooling crystallization enthalpy was 69 J/m. It was demonstrated that when the polylactic acid stereocomplex obtained in Example 1 was used as a nucleating agent, a polylactic acid stereocomplex with a single cooling crystallization peak was obtained only by performing general compounding. The resulting resin composition did not contain impurities and had good transparency.

Comparative Example 8

(A) poly-L-lactic acid and (B) poly-D-lactic acid were prepared as in Example 1. The (F) bulky polylactic acid resin composition obtained in Comparative Example 1 was prepared. The (A) poly-L-lactic acid, the (B) poly-D-lactic acid, and the (F) bulky polylactic acid resin composition obtained in Comparative Example 1 were previously dry-blended in a weight ratio (A)/(B)/(F) of 50/50/1. Subsequently, the blend was fed to a twin-screw extruder in which the number of screw revolutions was set at 150 rpm and the screw arrangement (type B) used was such that general kneading disks (L/D=3.8) were placed from the position of L/D=22, 28, and the blend was compounded at a barrel temperature of 210° C. in the area from the polymer melting part to the bent. The gut discharged from the die was allowed to pass for 15 seconds through a cooling bath filled with water having a controlled temperature of 10° C. so that the structure was fixed by rapid cooling. Subsequently, the gut was pelletized by a strand cutter so that transparent pellets were obtained. Also using CAE analysis software SCREWFLOW-MULTI installed in the extruder manufactured by The Japan Steel Works, Ltd., the initial positions of 1,000 particles were randomly determined at the time t=0 in a cross-section upstream of the screw, and the movement associated with the velocity field calculated by analysis on the screw to be evaluated was tracked by simulation so that the logarithm of the hypothetical elongation: $\ln L/L_0$, wherein L and $L_0$ represent the length of a line and the initial length of the line, respectively, was calculated. As a result, $\ln L/L_0$ for the type B was 1.5.

The resulting sample was subjected to measurement using a differential scanning calorimeter. A DSC curve was obtained by the measurement, and the cooling crystallization peak temperature and the cooling crystallization enthalpy were determined from the resulting DSC curve. The cooling crystallization peak temperature was 120° C., and the cooling crystallization enthalpy was 21 J/m. When the bulky polylactic acid resin composition obtained in Comparative Example 1 was used as a nucleating agent, the formation of a stereocomplex was not observed.

INDUSTRIAL APPLICABILITY

The polylactic acid stereocomplex has a high melting point, good heat resistance, and a high level of mechanical properties and chemical resistance. Taking advantage of these properties, the polylactic acid stereocomplex can be widely used to form molded products. The polylactic acid stereocomplex is useful for agricultural materials, gardening materials, fishing materials, civil engineering and building materials, stationery products, medical devices, and other applications.

The polylactic acid stereocomplex producing method can efficiently produce a polylactic acid stereocomplex by chaotic mixing.

In addition, a polylactic acid stereocomplex powder with a small average particle size can be obtained from the polylactic acid stereocomplex so that a highly effective nucleating agent can be provided for polylactic acid resin.

The invention claimed is:

1. A polylactic acid stereocomplex, produced by chaotic mixing which has a logarithm of hypothetical elongation: 1 $mL/L_0$, wherein L and $L_0$ represent a length of a line and an initial length of the line, respectively, in a particle tracking method, is 2 or more, comprising a crystal melting peak temperature of 215° C. or more, wherein the crystal melting peak is a single peak and has a peak half width of 12° C. or less, and a crystal melting enthalpy of 65 J/g or more as measured by differential scanning calorimetry.

2. The polylactic acid stereocomplex according to claim 1, which has a single peak with a cooling crystallization peak temperature of 165° C. or more and a cooling crystallization enthalpy of 60 J/g or more as measured by differential scanning calorimetry.

3. The polylactic acid stereocomplex according to claim 1, which comprises 30 to 70 parts by weight of (A) poly-L-lactic acid and 30 to 70 parts by weight of (B) poly-D-lactic acid based on 100 parts by weight of the total of (A) poly-L-lactic acid and (B) poly-D-lactic acid.

4. The polylactic acid stereocomplex according to claim 3, wherein (A) poly-L-lactic acid comprises 80% by mole or more of L-lactic acid units.

5. The polylactic acid stereocomplex according to claim 3, wherein (B) poly-D-lactic acid comprises 80% by mole or more of D-lactic acid units.

6. A method of producing a polylactic acid stereocomplex, comprising performing chaotic mixing of 30 to 70 parts by weight of (A) poly-L-lactic acid and 30 to 70 parts by weight of (B) poly-D-lactic acid based on 100 parts by weight of the total of (A) poly-L-lactic acid and (B) poly-D-lactic acid, wherein chaotic mixing has a logarithm of a hypothetical elongation: 1 $mL/L_0$, wherein L and $L_0$ represent a length of a line and an initial length of the line, respectively, in a particle tracking method, is 2 or more.

7. The method according to claim 6, further comprising performing chaotic mixing of 0.01 to 10 parts by weight of (C) a nucleating agent based on 100 parts by weight of the total of (A) poly-L-lactic acid and (B) poly-D-lactic acid.

8. The method according to claim 6, further comprising performing chaotic mixing of 0.01 to 10 parts by weight of (D) a plasticizer based on 100 parts by weight of the total of (A) poly-L-lactic acid and (B) poly-D-lactic acid.

9. A nucleating agent for polylactic acid resin comprising the stereocomplex according to claim 1.

10. The nucleating agent for polylactic acid resin according to claim 9, which has an average particle size of 500 μm or less.

11. A method of producing a polylactic acid resin composition, comprising compounding a polylactic acid resin with the nucleating agent for polylactic acid resin according to claim 9.

12. A molded product comprising the stereocomplex according to claim 1.

* * * * *

UNITED STATES PATENT AND TRADEMARK OFFICE
CERTIFICATE OF CORRECTION

PATENT NO. : 9,045,635 B2  Page 1 of 1
APPLICATION NO. : 13/390747
DATED : June 2, 2015
INVENTOR(S) : Ochiai et al.

It is certified that error appears in the above-identified patent and that said Letters Patent is hereby corrected as shown below:

In the claims

In Column 23

At lines 11 and 12, change "1 mL/$L_0$" to --1nL/$L_0$--.

In Column 24

At line 10, change "1 mL/$L_0$" to --1nL/$L_0$--.

Signed and Sealed this
Fifth Day of January, 2016

Michelle K. Lee
*Director of the United States Patent and Trademark Office*